United States Patent [19]

Aihara et al.

[11] 4,092,529

[45] May 30, 1978

[54] DETECTING HEAD FOR USE IN AN APPARATUS FOR READING OPTICALLY AN INFORMATION RECORDED ON A RECORD CARRIER AS A TRACK OR TRACKS

[75] Inventors: Takayuki Aihara, Hachioji; Kiyoshi Hori, Hino; Tadashi Morokuma, Tokyo, all of Japan

[73] Assignee: Olympus Optical Company Limited, Tokyo, Japan

[21] Appl. No.: 730,608

[22] Filed: Oct. 7, 1976

[30] Foreign Application Priority Data

Oct. 8, 1975 Japan .............................. 50-120765
Oct. 31, 1975 Japan .............................. 50-130527
Oct. 31, 1975 Japan .............................. 50-130528

[51] Int. Cl.$^2$ .............................................. G01J 1/20
[52] U.S. Cl. ................................ 250/201; 250/239; 358/128
[58] Field of Search ............... 250/201, 204, 239, 570; 358/128; 179/100.3 V, 100.3 G

[56] References Cited

U.S. PATENT DOCUMENTS

| | | | |
|---|---|---|---|
| 3,381,086 | 4/1968 | Moss et al. | 179/100.3 V |
| 3,530,258 | 9/1970 | Gregg et al. | 179/100.3 V |
| 3,909,608 | 9/1975 | Le Merer et al. | 179/100.3 G |
| 3,932,700 | 1/1976 | Snopko | 250/201 |

*Primary Examiner*—David C. Nelms
*Attorney, Agent, or Firm*—Haseltine, Lake & Waters

[57] ABSTRACT

A detecting head for use in an apparatus for reading optically information recorded on a record carrier as a track or tracks comprising an optical system including a projection lens for projecting a light spot onto the track to be read and a device for detecting a relative position between the light spot and the track. The optical system further comprises a device for supporting the projection lens movably in a direction perpendicular to a track direction and a device for driving the projection lens in this direction. The projection lens is further moved in a direction parallel to the track or in a direction parallel to the optical axis of the projection lens.

11 Claims, 12 Drawing Figures

DETECTING HEAD FOR USE IN AN APPARATUS FOR READING OPTICALLY AN INFORMATION RECORDED ON A RECORD CARRIER AS A TRACK OR TRACKS

BACKGROUND OF THE INVENTION

The invention relates to a detecting head for use in apparatus for reading optically an information recorded on a record carrier as a track or tracks.

A typical example of the record carrier on which the optically detectable information is recorded as a track or tracks is a disc shaped record generally called a video disc. In this disc shaped record carrier the information is recorded along a number of concentric tracks or a single spiral track. A known apparatus for reading optically the information recorded on the record carrier comprises an optical system for projecting a light spot onto a track of the record carrier and a position detecting means for detecting a relative position of the information track and the spot of light.

Figure 1:
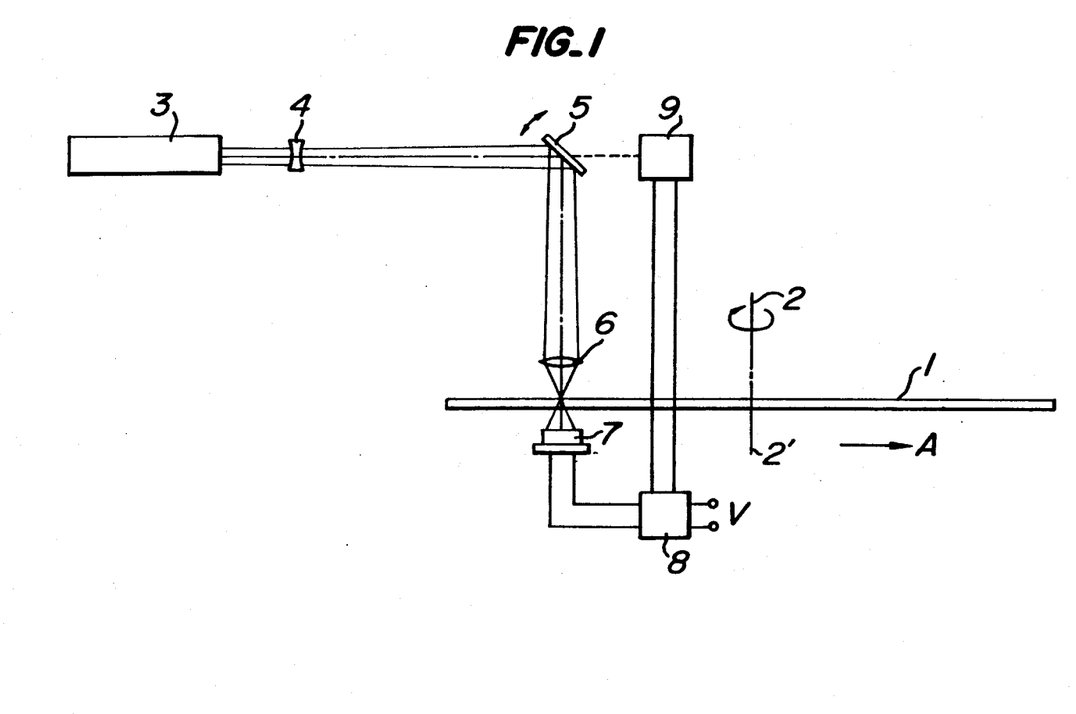
FIG. 1 is a diagrammatic view showing a known optically reading head.

FIG. 1 shows an embodiment of such a known apparatus. In this embodiment a video disc 1 is rotated about an axis 2-2' at a constant speed of, for example, 1,800 r.p.m. A laser beam emitted from a laser light source 3 is focussed by means of an auxiliary lens 4, a reflection mirror 5 and a projection lens 6 onto the video disc 1. In this case the laser beam passing through the record carrier 1 is modulated in accordance with the information recorded in the carrier 1. This laser beam with the modulated intensity is detected by a photodetector 7 which produces an electrical output signal representing the information recorded on the carrier 1. It should be noted that the laser beam may be reflected by the record carrier and the reflected beam may be detected by a photodetector, which in this case is arranged on the same side as the lens 6 with respect to the carrier 1. The output signal from the photodetector 7 is supplied to a processor 8 in which the output signal is processed so as to produce the original information signal V.

In order to read the information out of the carrier 1, the light spot focussed by the projection lens 6 onto the carrier 1 should be aligned accurately on the information track to be read. For this purpose in the apparatus the light beam system including the laser light source 3, the auxiliary lens 4, the reflection mirror 5 and the projection lens 6 are moved relative to the video disc 1 by means of a suitable driving means in a direction perpendicular to a scanning or reading direction at a constant speed (shown by an arrow A in FIG. 1). Additionally in order to compensate deviations of the information tracks and the light spot due to a configuration error of the tracks and an eccentricity of the video disc, the reflection mirror 5 is pivotted about an axis perpendicular to a plane of the drawing so as to control the position of the light spot projected on the record carrier 1. To this end the processor 8 produces a tracking signal C which is supplied to a mirror driving device 9 for rotating the mirror 5. However, in order to effect such an alignment, the projection lens 6 has to satisfy the following conditions simultaneously.

(1) The projection lens should have a property which can focus the laser beam into a spot having a given diameter even if the reflection mirror 5 is rotated.

(2) In general, the amount of the eccentricity of the video disc is hardly limited within 0.1 mm. Therefore, the projection lens should be free from aberration over a range of at least 0.1 mm at the carrier surface.

(3) Since a width of the track on the record carrier is normally smaller than 1 μm, the projection lens should have a numerical aperture of about 0.4.

(4) In order to focus the light spot onto the carrier surface, the projection lens must be moved in the direction perpendicular to the carrier surface. Thus, the weight of the projection lens should be light, possibly lighter than 10 grams.

In the case of designing the projection lens which satisfies the above properties, the number of lens components is naturally increased. Therefore, it is difficult to obtain a lens which is sufficiently light in weight. Moreover, the cost for manufacturing such a lens is increased.

SUMMARY OF THE INVENTION

The present invention has for its object to provide an information detecting head for use in the apparatus for reading optically the information recorded on the record carrier, in which use can be made of a projection lens which need not satisfy the above mentioned superior properties.

According to the invention, a detecting head for use in apparatus for reading optically an information recorded on a read carrier as a track or tracks comprises an optical system having a projection lens for projecting a light spot onto the surface of the record carrier and means for detecting a relative position between the light spot and the track to be read, wherein said optical system further comprises means for supporting the projection lens movably in a direction perpendicular to an optical axis of the projection lens and means for driving the projection lens in said direction, whereby said driving means is controlled by a signal supplied from said position detecting means.

According to a preferred embodiment of the reading head of the invention, said driving means consists of a moving coil system.

DETAILED DESCRIPTION

Figure 2:
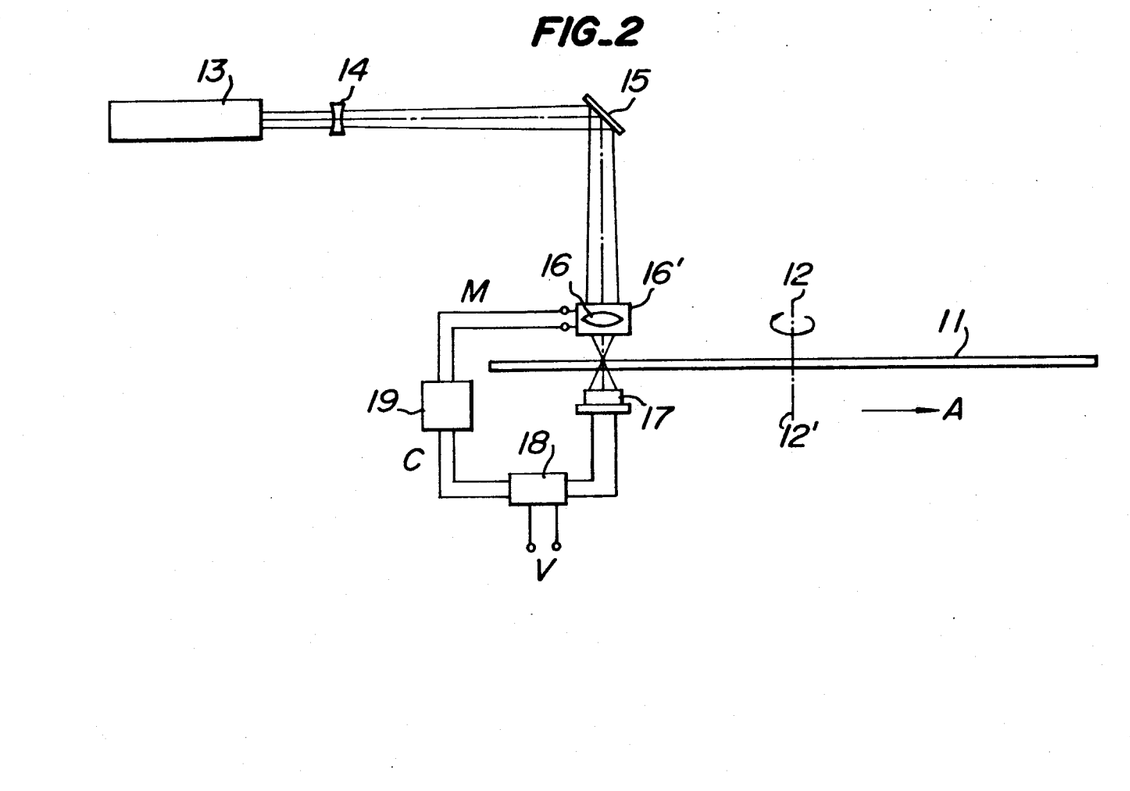
FIG. 2 is a diagrammatic view illustrating an optically reading head according to the invention.

FIG. 2 shows diagrammatically a basic construction of an optical reading head according to the invention. A disc shaped record carrier 11 is rotated about an axis 12-12' at a constant speed. A laser beam from a laser source 13 is projected on a surface of the carrier 11 by means of a lens 14, a reflection mirror 15 and a projection lens 16. The laser beam which is modulated by information recorded in the record carrier 11 is detected by a photodetector 17. An output signal from the photodetector 17 is supplied to a processor 18 which produces an information signal V and a tracking signal C. According to the invention the reflection mirror 15 is not pivotted, but is fixed and the projection lens 16 is supported in a projection lens member 16' in such a manner that the projection lens 16 can be moved in a direction perpendicular to its optical axis and the track direction.

When the light spot projected on the record carrier 11 is shifted relative to the track in a direction perpendicular to the track direction, the intensity of the light beam passing through the carrier 11 causes unbalance on the left and right sides of the center of the track. This unbalance can be detected by the photodetector 17 in the known manner. The processor 18 produces a tracking signal which indicates the direction and amount of deviation of the light spot relative to the track center. This tracking signal is supplied to a driving circuit 19 which produces a driving signal M for the projection lens driving means. In this manner the projection lens 16 can be moved in the horizontal direction in the drawing of FIG. 2 so as to align the light spot on the track to be scanned. A feedback control loop is formed by the projection lens device 16', the photodexector 17, the processor 18 and the driving circuit 19. In this feedback control loop, if the magnification of the projection lens 16 is M, a deviation of the light spot relative to the optical axis is a distance over which the lens 16 is moved, and thus a deviation of the information track multiplied by M. For example, if the magnification of the lens 16 is 1/20 and the deviation of the track is 0.1 mm, the deviation of the light spot with respect to the optical axis is only 0.005 mm. This means that the projection lens 16 is sufficient to be free from aberration only within a range of 0.005 mm. If the laser beam passing through the lens 16 is a parallel beam, M=0 and thus the deviation of the light spot with respect to the optical axis is made completely zero. In this case it is sufficient for the lens 16 to be free from aberration only on the optical axis.

As explained above, according to the invention the magnitude of the deviation of the light spot with respect to the optical axis is reduced by the magnification M of the lens 16. The projection lens 16 which satisfies the above requirements can be realized by means of at most three spherical lens components even if the numerical aperture is 0.4. If a non-spherical lens system is used, it is possible to design the projection lens only by a single non-spherical lens component. Therefore it is quite easy to obtain the projection lens 16 which is lighter than 10 grams. Moreover, the construction of the projection lens is simple and the projection lens can be manufactured in a simple and inexpensive manner.

Figure 3:
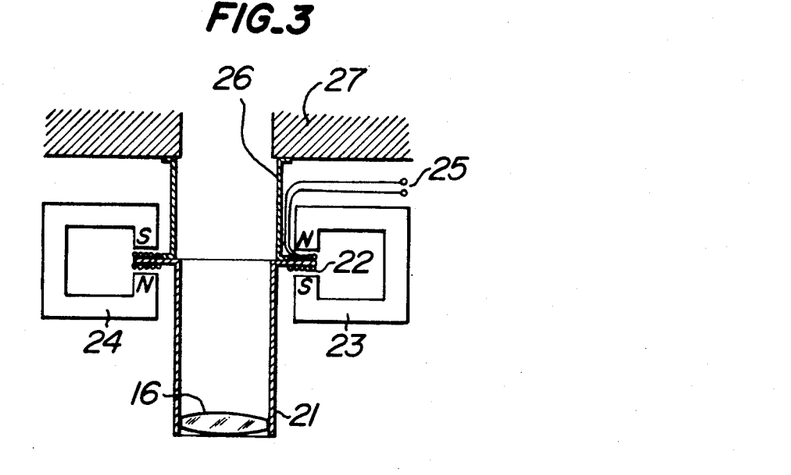
FIG. 3 is a cross sectional view showing a first embodiment of a projection lens device of the reading head according to the invention.

FIG. 3 shows a first embodiment of the projection lens device 16'. In this embodiment the projection lens 16 is fixed at a lower end of a tube 21, an upper end of which is provided with a flange to which a helically wound coil 22 is secured. This coil 22 is arranged between pole pieces of a pair of permanent magnets 23 and 24. To the coil 22 the driving signal M from the driving circuit 19 in FIG. 2 is supplied by means of lead wires 25. The upper end of the tube 21 is connected to a lower end of a resilient supporting member 26, an upper end of which is fixed to a base 27.

Figure 4:
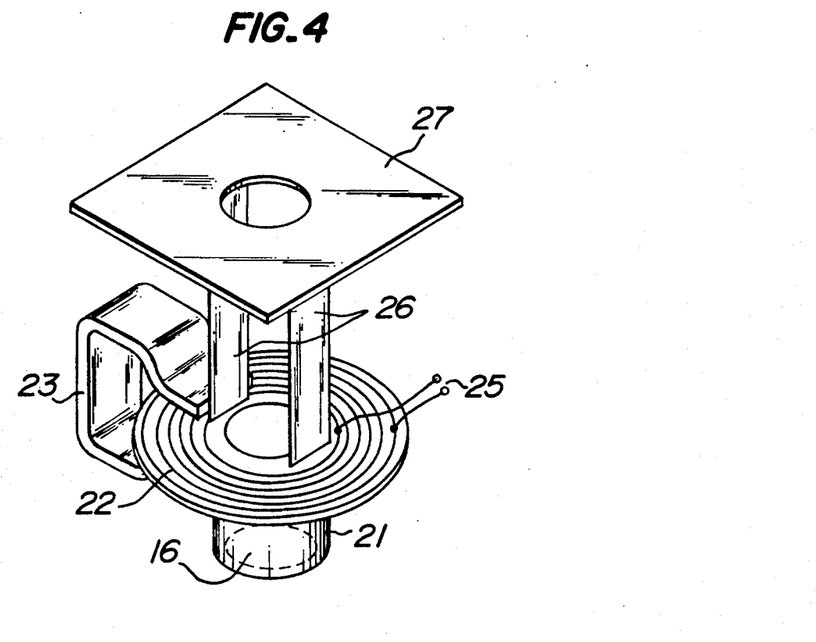
FIG. 4 is a perspective view illustrating a second embodiment of the projection lens device according to the invention.

When the driving signal M is supplied through the lead wire 25 to the coil 22, the coil is subjected to a lateral force in the drawing of FIG. 3. Therefore, the tube 21 and thus the projection lens 16 is moved in the direction perpendicular to the optical axis. In this manner, the light spot can be aligned on the track of the record carrier by controlling the current passing through the coil 22. In this embodiment use is made of two magnets 23 and 24, but in principle it is sufficient to use either one of them. FIG. 4 is a perspective view illustrating a second embodiment of the optically reading head according to the invention in which only the single magnet 23 is used. The remaining construction of the reading head of this embodiment is entirely same as that of the first embodiment shown in FIG. 3.

If the rotation speed of the disc shaped record carrier, such as a video disc, fluctuates, the light spot deviates in the direction of the information track. This results in a time base error in the reproduced signal. In the known apparatus, such a time base error is compensated electrically by means of a rather complicated electronic device.

According to the invention, the deviation of the light spot in the track direction can be compensated by moving the projection lens in the direction of the track.

Figure 5:
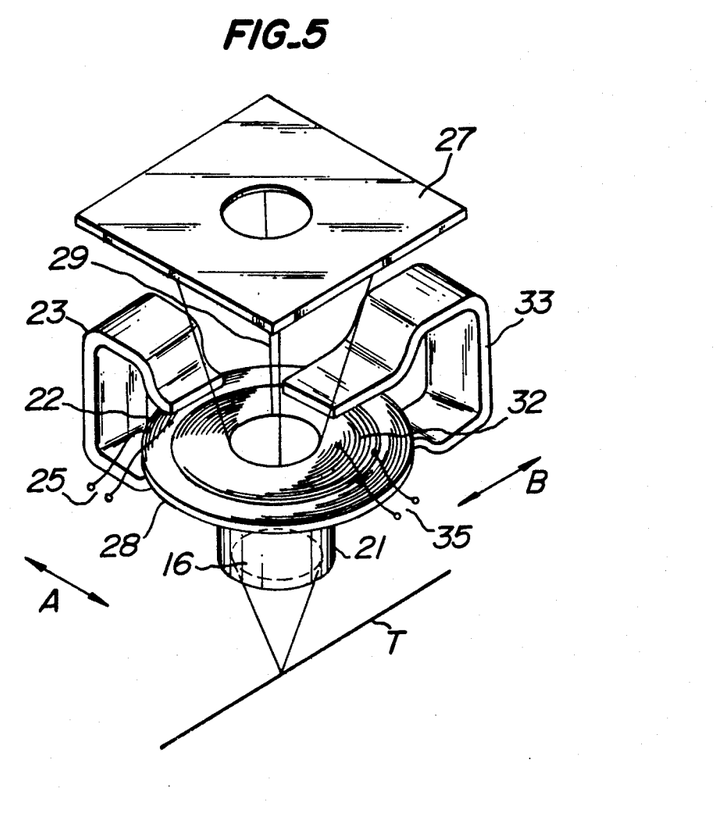
FIGS. 5 and 6 are perspective views depicting two embodiments of the reading head according to the invention in which the projection lens is moved in two orthogonal directions.

FIG. 5 is a perspective view showing a third embodiment of the optically reading head according to the invention, in which the projection lens can be moved in the direction of the track as well as in the direction perpendicular to the track. In this embodiment, the processor 18 has to produce a time base error signal as well as the tracking signal. A projection lens 16 is fixed to a lower end of a tube 21, an upper end of which is secured to a supporting plate 28. On a surface of the plate 28 are arranged a pair of coils 22 and 32. The coil 22 is energized by the tracking signal supplied through lead wires 25 and the coil 32 is energized by the time base error signal supplied through lead wires 35. A first permanent magnet 23 is arranged across the coil 22 and a second permanent magnet 33 is arranged across the coil 32. The first magnet 23 is arranged in a direction A which is perpendicular to a track T. The second magnet 33 is arranged in a direction B which is parallel to the direction of the track T. The supporting plate 28 is coupled to a base 27 by means of a resilient supporting member, which in this embodiment is composed of four resilient wires 29. By this measure the projection lens 16 can be moved substantially parallel to the directions A and B.

When the tracking signal is supplied to the first coil 22, the coil is subjected to a force in the direction A and thus the projection lens 16 is shifted in the direction A perpendicular to the track T. When the time base error signal is supplied to the second coil 32, the coil 32 is subjected to a force in the direction B so that the projection lens 16 is moved in the track direction B. In this manner it is possible to align the light spot on a particular point on the track T to be scanned by controlling the currents passing through the coils 22 and 32.

Figure 6:
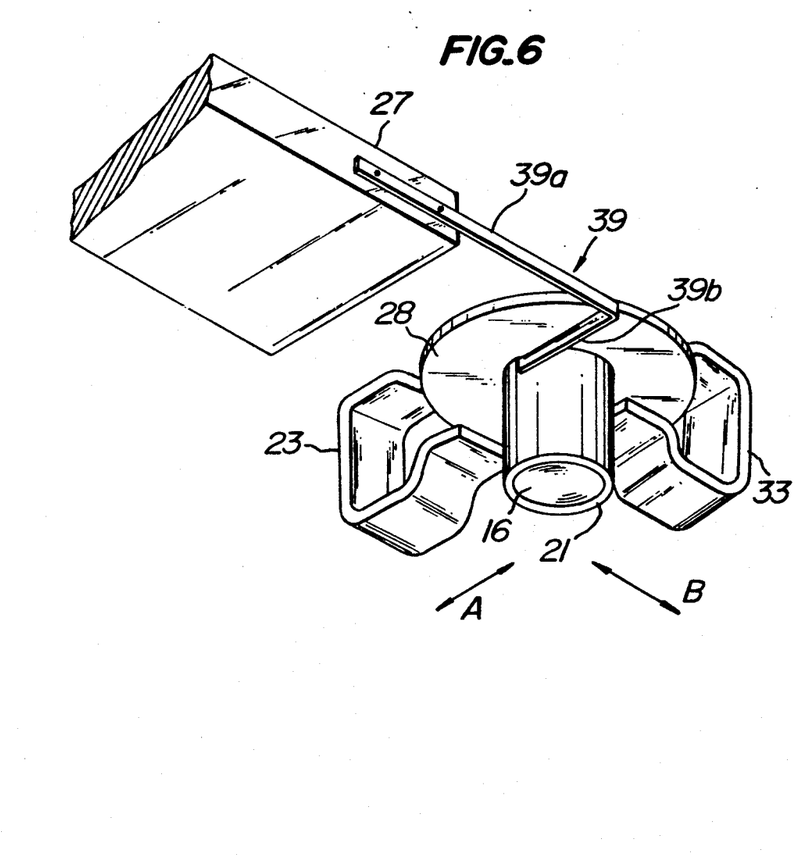

FIG. 6 is a perspective view of a modified embodiment of the reading head according to the invention. In this embodiment a resilient supporting member consists of an L-shaped leaf spring 39 having first and second straight portions 39a and 39b. The first portion 39a is bent when the projection lens 16 is moved in the direction A, whereas the second portion 39b is bent when the projection lens 16 is shifted in the direction B.

In the embodiments shown in FIGS. 5 and 6 two further magnets may be arranged, each of which is positioned opposite the magnets 23 and 33, respectively as the embodiment shown in FIG. 3.

As described above, the light spot must be focussed on the track during the scanning. For this purpose it is necessary to move the projection lens in a direction parallel to its optical axis.

Figure 7:
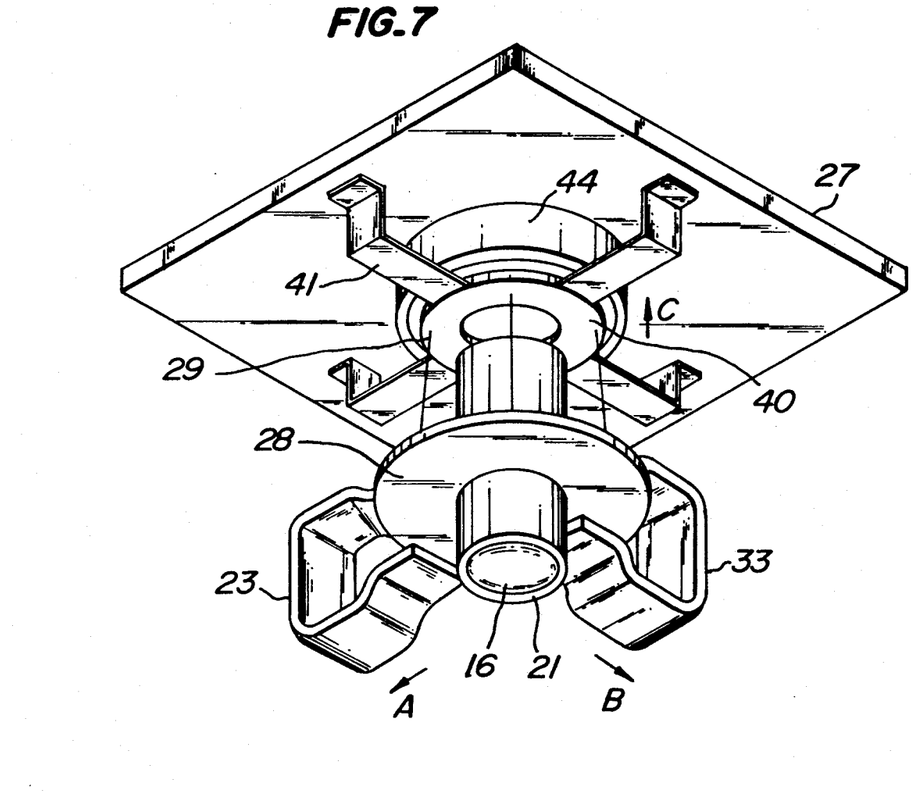
FIG. 7 is a perspective view showing an embodiment of a reading head in which the projection lens can be moved three dimensionally.
Figure 8:
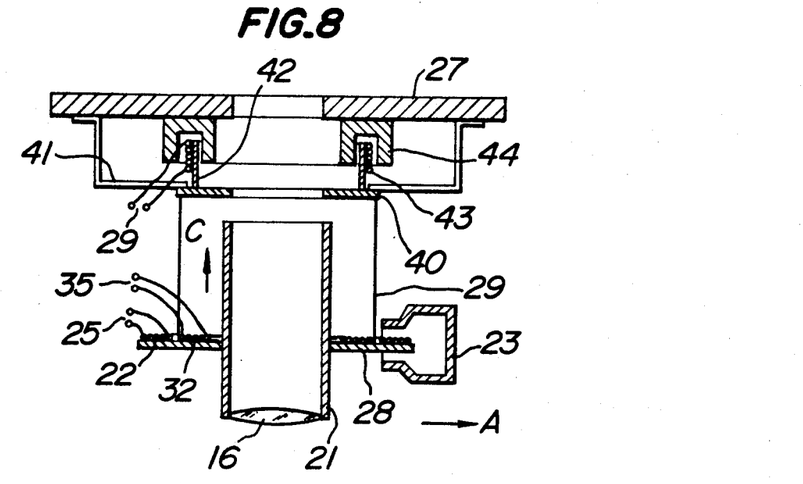
FIGS. 8 and 9 are cross sectional and bottom views, respectively of the reading head of FIG. 7.
Figure 9:
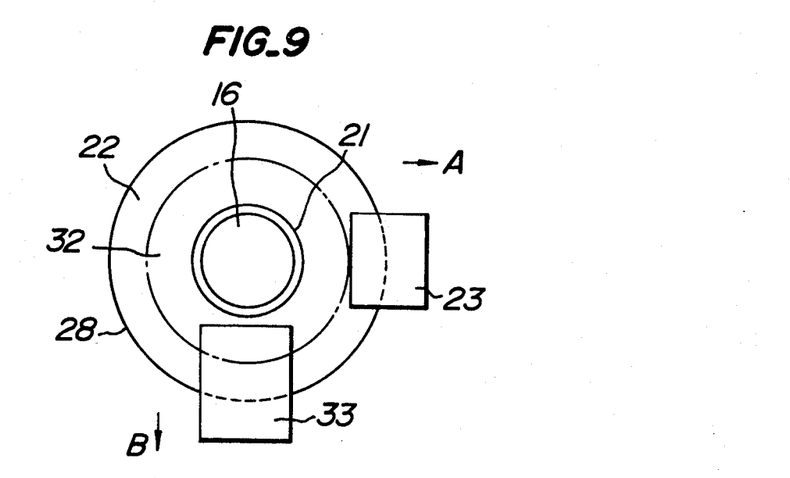

FIGS. 7 to 9 show another embodiment of the reading head according to the invention in which a projection lens 16 is arranged to move three dimensionally, i.e. a direction A perpendicular to the track direction, a track direction B and a direction C perpendicular to the directions A and C and thus the optical axis direction. The mechanism for supporting the projection lens 16 in a movable manner in the directions A and B is same so as that shown in FIG. 5. In this embodiment the resilient wires 29 are connected to an annular disc 40 which is secured to a base 27 by means of leaf springs 41 in such a manner that it can be moved in the optical axial direction C of the projection lens 16. As clearly shown in FIG. 8, to the upper surface of the annular disc 40 is fixed a cylindrical body 42. A coil 43 is wound on the outer surface of the cylindrical body 42 and the coil 43 is arranged in an annular permanent magnet 44 which is secured to the base 27. Thus, when the coil 43 is energized, it is subjected to a force in the direction C so that the projection lens 16 is moved in this direction C. In this embodiment, the processor 18 (see FIG. 2) has to produce an auto-focussing signal which represents an amount and direction of defocus of the light spot on the record carrier as well as the tracking and time base error signals.

Figure 10:
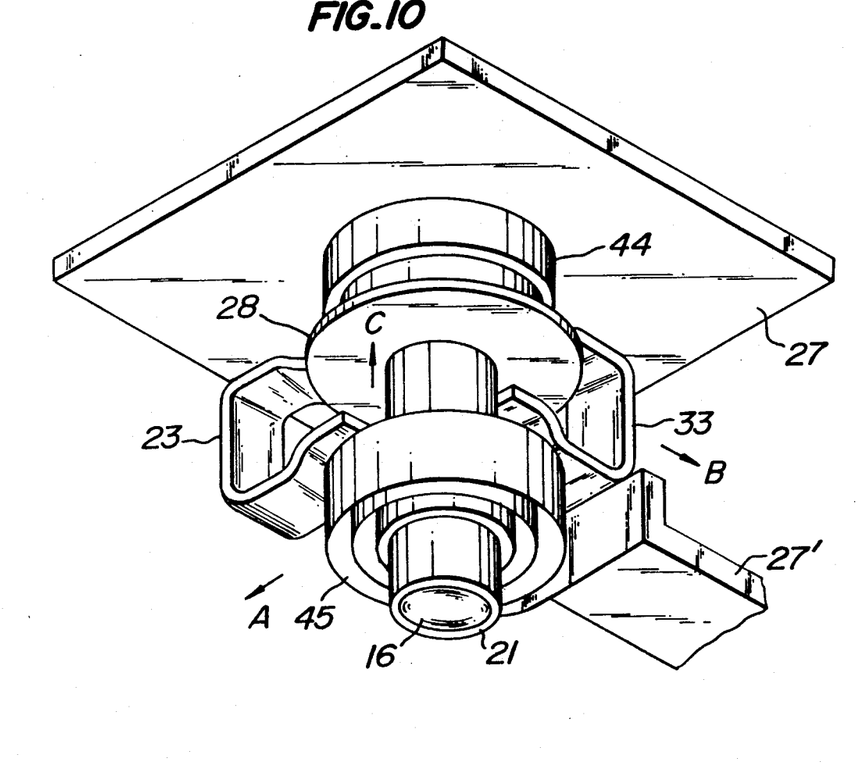
FIG. 10 is a perspective view illustrating a first modification of the reading head of FIG. 7.

FIG. 10 is a perspective view illustrating a modification of the reading head shown in FIG. 7. In this modified embodiment the tube 21 is supported by a coiled leaf spring 45 which is coupled to a base portion 27'.

Figure 11:
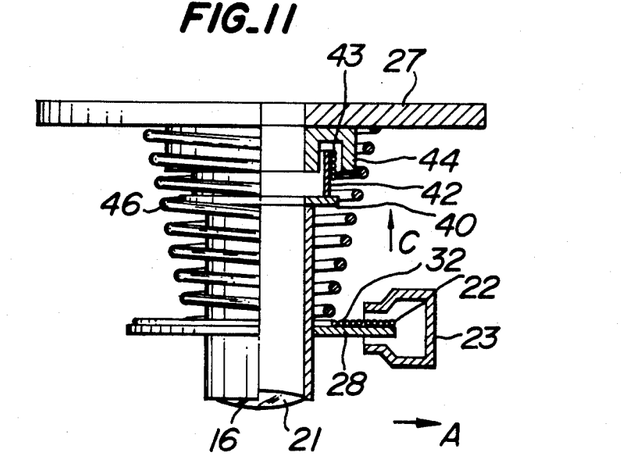
FIG. 11 is a half sectional and half front view of a second modification of the reading head shown in FIG. 7.

FIG. 11 is a half sectional and half front view showing a second modification in which the tube 21 is suspended by a coiled spring 46 which is secured to the base 27.

Figure 12:
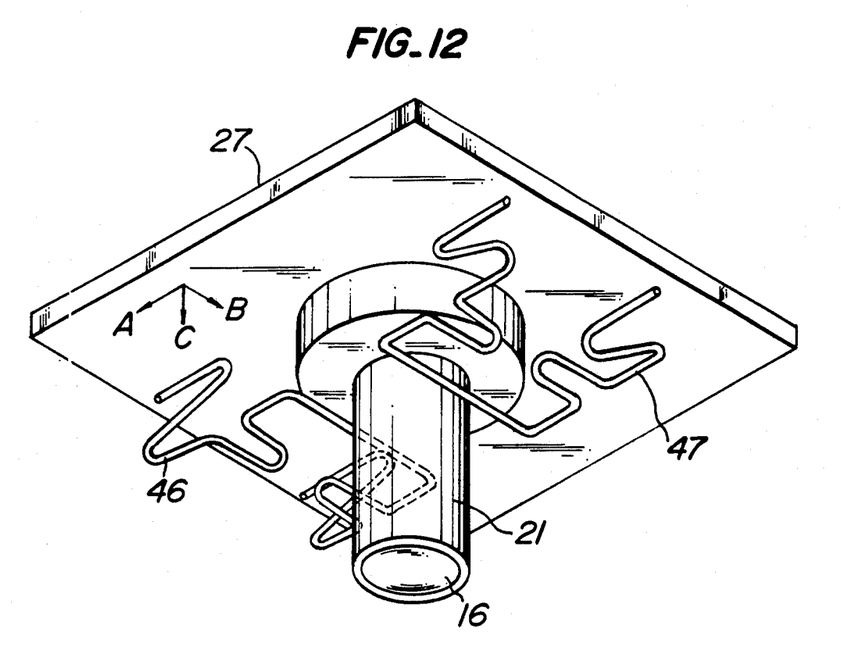
FIG. 12 is a perspective view illustrating a third modification of the reading head of FIG. 7.

FIG. 12 shows a pair of resilient supporting means 46 and 47 for movably supporting the tube 21 in the directions A, B and C. The supporting means is composed of resilient rods which are specially bent as shown in FIG. 12. That is, the rods are bent three dimensionally, so as to allow the movement of the projection lens in the three directions A, B and C.

It should be noted that the present invention is not limited to the embodiments shown in the drawings and many modifications are possible within the scope of the invention. For example, in the above embodiments use is made of the permanent magnet and the coils are energized by the tracking signal, time base error signal and autofocussing signal. But use may be made of an electromagnet and the controlling signals may be supplied to a winding on the electromagnet. Moreover, the record carrier may be a reflection type. The information tracks may be recorded concentrically instead of spirally. The record carrier may be a cylindrical body in which the record track is made spirally.

What is claimed is:

1. A detecting head for use in an apparatus for reading optically information recorded on a record carrier as a track or tracks comprising an optical system including a projection lens having an optical axis for projecting a light spot on the surface of the record carrier and means for detecting the relative position between the light spot and the track to be read, said optical system further comprising means for supporting the projection lens movably in a direction perpendicular to the optical axis of the projection lens and perpendicular to the track direction and means for driving the projection lens in said direction in which it is movable comprising a coil secured to said projection lens supporting means and a magnet having pole pieces arranged across the coil, and means connecting the position detecting means and said coil of the driving means such that a signal supplied from said position detecting means is supplied to said coil of the driving means.

2. A detecting head according to claim 1, wherein said supporting means supports the projection lens in such a manner that the projection lens is moved both in said direction and a direction parallel to the track.

3. A detecting head according to claim 1, wherein said supporting means supports the projection lens in a three dimensionally movable manner, including movement in a first direction perpendicular to the track, a second direction parallel to the track and a third direction parallel to the optical axis of the projection lens.

4. A detecting head according to claim 1, wherein the projection lens is arranged in a tube, said coil is secured to the tube and the tube is suspended by resilient leaf springs.

5. A detecting head according to claim 2, wherein the projection lens is arranged in a tube, said coils are secured to the tube and the tube is suspended by resilient wires.

6. A detecting head according to claim 2, wherein said projection lens is provided in a tube, said coils are secured to the tube and the tube is supported by an L-shaped leaf spring arranged in a plane parallel to a plane in which the projection lens is moved.

7. A detecting head according to claim 3, wherein said driving means comprises a first, second and third sets of coils and magnets for moving the projection lens in the first, second and third directions, respectively.

8. A detecting head according to claim 7, wherein said projection lens is arranged in a tube to which the coils of said first and second sets of coil and magnet are secured, the tube is suspended by resilient wires from an annular disc which is coupled to a base movably in said third direction and the coil of said third set of coil and magnet is secured to the disc.

9. A detecting head according to claim 7, wherein said projection lens is arranged in a tube to which the coils of said first, second and third sets of coil and magnet are secured and the tube is supported by a coiled leaf spring.

10. A detecting head according to claim 7, wherein said projection lens is arranged in a tube, the coils of said first, second and third sets of coil and magnet are secured to the tube and the tube is supported by a spirally coiled spring.

11. A detecting head according to claim 7, wherein said projection lens is arranged in a tube, the coils of said first, second and third sets of coil and magnet are secured to the tube and the tube is supported by a pair of three dimensionally bent resilient rods.

* * * * *

REEXAMINATION CERTIFICATE (810th)
United States Patent [19]
Aihara et al.

[11] B1 4,092,529
[45] Certificate Issued  Jan. 19, 1988

[54] DETECTING HEAD FOR USE IN AN APPARATUS FOR READING OPTICALLY AN INFORMATION RECORDED ON A RECORD CARRIER AS A TRACK OR TRACKS

[75] Inventors: Takayuki Aihara, Hachioji; Kiyoshi Hori, Hino; Tadashi Morokuma, Tokyo, all of Japan

[73] Assignee: Olympus Optical Company Limited, Tokyo, Japan

Reexamination Request:
No. 90/001,195, Mar. 20, 1987

Reexamination Certificate for:
Patent No.: 4,092,529
Issued: May 30, 1978
Appl. No.: 730,608
Filed: Oct. 7, 1976

[30] Foreign Application Priority Data

Oct. 8, 1975 [JP] Japan .................. 50-120765
Oct. 31, 1975 [JP] Japan .................. 50-130527
Oct. 31, 1975 [JP] Japan .................. 50-130528

[51] Int. Cl.$^4$ .............................................. G01J 1/20
[52] U.S. Cl. ..................... 250/201; 250/239; 369/44; 369/45
[58] Field of Search ............... 250/201, 202, 216, 239; 369/44–46; 358/342

[56] References Cited

U.S. PATENT DOCUMENTS

| | | | |
|---|---|---|---|
| 3,381,086 | 4/1968 | Moss | 369/43 |
| 3,530,258 | 9/1970 | Gregg | 369/43 |
| 3,909,608 | 9/1975 | LeMerer | 369/44 |
| 3,914,595 | 10/1975 | Tinet | 250/202 |
| 3,932,700 | 1/1976 | Snopko | 250/201 |
| 3,946,367 | 3/1976 | Wohlmut et al. | 369/45 |
| 4,003,059 | 1/1977 | Sugiura et al. | 369/45 |

FOREIGN PATENT DOCUMENTS

| | | |
|---|---|---|
| 999079 | 10/1976 | Canada . |
| 2310059 | 2/1973 | Fed. Rep. of Germany . |
| 7206886 | 9/1973 | France . |
| 1421586 | 1/1976 | United Kingdom . |
| 48-101103 | 12/1973 | Japan . |

*Primary Examiner*—David C. Nelms

[57] ABSTRACT

A detecting head for use in an apparatus for reading optically information recorded on a record carrier as a track or tracks comprising an optical system including a projection lens for projecting a light spot onto the track to be read and a device for detecting a relative position between the light spot and the track. The optical system further comprises a device for supporting the projection lens movably in a direction perpendicular to a track direction and a device for driving the projection lens in this direction. The projection lens is further moved in a direction parallel to the track or in a direction parallel to the optical axis of the projection lens.

REEXAMINATION CERTIFICATE ISSUED UNDER 35 U.S.C. 307

The PATENT IS HEREBY AMENDED AS INDICATED BELOW. ps

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, and 6 are cancelled.

Claims 1, 3, 5, 7 and 8 are determined to be patentable as amended.

Claims 9-11, dependent on an amended claim, is determined to be patentable.

New claims 12-30 are added and determined to be patentable.

1. A detecting head for use in an apparatus for reading optically information recored on a record carrier as a track or tracks comprising an optical system including a projection lens having an optical axis for projecting a light spot on the surface of the record carrier and means for detecting the relative position between the light spot and the track to be read, said optical system further comprising means for supporting the projection lens movably *at least* in a *first* direction perpendicular to the optical axis of the projection lens and perpendicular to the track direction *and in a second direction parallel to the optical axis of said projection lens* and means for driving the projection lens in said [direction] *first and second directions* in which it is movable comprising [a coil] *first and second coils* secured to said projection lens supporting means *for moving the projection lens in said first and second directions, respectively,* and a magnet *means* having pole pieces arranged across the [coil] *first and second coils*, and means connecting the position detecting means and said [coil] *first and second coils* of the driving means such that [a signal] *signals* supplied from said position detecting means [is] *are* supplied to said [coil] *first and second coils* of the driving means.

3. A detecting head according to claim 1, wherein said supporting means supports the projection lens in a three dimensionally movable manner, including movement in [a] *said* first direction perpendicular to the track, [a] *said* second direction parallel to the [track] *optical axis of the projection lens* and a third direction parallel to the [optical axis of the projection lens] *track*.

5. A detecting head according to claim [2] *1*, wherein the projection lens is arranged in a tube, said [coils are] *first coil is* secured to the tube and the tube is suspended by resilient wires.

7. A detecting head according to claim 3, wherein said driving means comprises [a] first, second and third sets of coils and magnets for moving the projection lens in the first, second and third directions, respectively.

8. A detecting head according to claim 7, wherein said projection lens is arranged in a tube to which the coils of said first and [second] *third* sets of coils and magnet are secured, the tube is suspended by resilient wires from an annular disc which is coupled to a base movably in said [third] *second* direction and the coil of said [third] *second* set of coil and magnet is secured to the disc.

12. *A detecting head according to claim 1, wherein said first and second coils are integrally coupled with said projection lens such that an assembly of said projection lens and first and second coils is movable in said first and second directions.*

13. *A detecting head according to claim 1, wherein at least a part of said projection lens supporting means comprises a resilient means which is displaceable in at least a two dimensionally movable manner.*

14. *A detecting head according to claim 13, wherein said resilient means comprises an integrally formed resilient member.*

15. *A detecting head for use in an apparatus for reading optically information recorded on a record carrier as a track or tracks comprising an optical system including a projection lens having an optical axis for projecting a light spot on the surface of the record carrier and means for detecting the relative position between the light spot and the track to be read, said optical system further comprising means for supporting the projection lens movably in a direction perpendicular to the optical axis of the projection lens and perpendicular to the track direction and means for driving the projection lens in said direction in which it is movable comprising a coil secured to said projection lens supporting means without an intervening rod-like member between said coil and projection lens supporting means and a magnet having pole pieces arranged across the coil, and means connecting the position detecting means and said coil of the driving means such that a signal supplied from said position detecting means is supplied to said coil of the driving means.*

16. *A detecting head according to claim 15, wherein said supporting means supports the projection lens in such a manner that the projection lens is moved both in said direction and a direction parallel to the track.*

17. *A detecting head according to claim 15, wherein said supporting means supports the projection lens in a three dimensionally movable manner, including movement in a first direction perpendicular to the track, a second direction parallel to the track and a third direction parallel to the optical axis of the projection lens.*

18. *A detecting head according to claim 15, wherein the projection lens is arranged in a tube, said coil is secured to the tube and the tube is suspended by resilient leaf springs.*

19. *A detecting head according to claim 16, wherein the projection lens is arranged in a tube, said coils are secured to the tube and the tube is suspended by resilient wires.*

20. *A detecting head according to claim 16, wherein said projection lens is provided in a tube, said coils are secured to the tube and the tube is supported by an L-shaped leaf spring arranged in a plane parallel to a plane in which the projection lens is moved.*

21. *A detecting head according to claim 17, wherein said driving means comprises first, second and third sets of coils and magnets for moving the projection lens in the first, second and third directions, respectively.*

22. *A detecting head according to claim 21, wherein said projection lens is arranged in a tube to which the coils of said first and second sets of coil and magnet are secured, the tube is suspended by resilient wires from an annular disc which is coupled to a base movably in said third direc-* tion and the coil of said third set of coil and magnet is secured to the disc.

23. A detecting head according to claim 21, wherein said projection lens is arranged in a tube to which the coils of said first, second and third sets of coil and magnet are secured and the tube is supported by a coiled leaf spring.

24. A detecting head according to claim 21, wherein said projection lens is arranged in a tube, the coils of said first, second and third sets of coil and magnet are secured to the tube and the tube is supported by a spirally coiled spring.

25. A detecting head according to claim 21, wherein said projection lens is arranged in a tube, the coils of said first, second and third sets of coil and magnet are secured to the tube and the tube is supported by a pair of three dimensionally bent resilient rods.

26. A detecting head according to claim 15, wherein at least a part of said projection lens supporting means comprises a resilient means which is displaceable in at least said direction.

27. A detecting head according to claim 26, wherein said resilient means comprises an integrally formed resilient member.

28. A detecting head for use in an apparatus for reading optically information recorded on a record carrier as a track or tracks comprising an optical system including a projection lens having an optical axis for projecting a light spot on the surface of the record carrier and means for detecting the relative position between the light spot and the track to be read, said optical system further comprising means for supporting the projection lens movably in a direction perpendicular to the optical axis of the projection lens and perpendicular to the track direction and including a resilient member which is arranged adjacent to a plane containing the optical axis of the projection lens and extending substantially in parallel with the track direction, means for driving the projection lens in said direction in which it is movable comprising a coil secured to said projection lens supporting means and a magnet having pole pieces arranged across the coil, and means connecting the position detecting means and said coil of the driving means such that a signal supplied from said position detecting means is supplied to said coil of the driving means.

29. A detecting head according to claim 28, wherein said resilient member is substantially symmetrically disposed with respect to said plane.

30. A detecting head according to claim 28, wherein said resilient member is arranged along said plane.

* * * * *